United States Patent [19]
Rehrig

[11] Patent Number: 4,746,134
[45] Date of Patent: May 24, 1988

[54] PLASTIC WHEELED CART CHASSIS HAVING A REINFORCED STRUCTURE

[76] Inventor: Houston Rehrig, 505 S. Orange Grove Blvd., Pasadena, Calif. 91105

[21] Appl. No.: 28,448

[22] Filed: Mar. 20, 1987

Related U.S. Application Data

[63] Continuation-in-part of Ser. No. 729,936, May 3, 1985, abandoned.

[51] Int. Cl.$^4$ .............................................. B62D 39/00
[52] U.S. Cl. ............................................. 280/33.99 R
[58] Field of Search ................. 280/33.99 R, 33.99 A, 280/33.99 F, 33.99 H, 33.99 S

[56] References Cited

U.S. PATENT DOCUMENTS 3,999,774  12/1976  Rehrig ........................... 280/33.99 R
4,273,346   6/1981  Rehrig ........................... 280/33.99 H

FOREIGN PATENT DOCUMENTS 2537214  3/1977  Fed. Rep. of Germany ... 280/33.99 R Primary Examiner—John J. Love
Assistant Examiner—Richard Camby
Attorney, Agent, or Firm—Banner, Birch, McKie & Beckett

[57] ABSTRACT

A reinforced plastic wheeled cart chassis for use with a bottom-supported plastic basket having a downwardly facing basket mounting portion. The chassis includes a molded longitudinally extending base, with front and rear wheels. A basket support is connected to the base which has coupling means for quickly and releasably coupling a basket to the chassis. Each of the major structural elements of the chassis is provided with reinforcing rails and plates to increase the strength and rigidity of the chassis.

11 Claims, 8 Drawing Sheets

PLASTIC WHEELED CART CHASSIS HAVING A REINFORCED STRUCTURE

BACKGROUND OF THE INVENTION

This application is a continuation-in-part of application Ser. No. 729,936 filed May 3, 1985, now abondoned.

The present invention relates generally to the field of wheeled carts such as to those used as grocery shopping carts in supermarkets and the like, and more particularly, is directed to a novel plastic wheeled cart chassis having a reinforced structure for use with a bottom-supported basket.

Ideally, carts of this type, and particularly those used in supermarkets and grocery stores, should have the following characteristics. First, they should be able to withstand a great deal of abuse, particularly to the basket portion as carts are continuously impacted with one another and with stationary objects. Second, the carts should be easy to push and to maneuver. The condition of the cart wheels has a great effect on this characteristic, but so does the weight of the cart. Third, the carts should be of such design and such surface finish as not to have a propensity to collect dirt and contaminants. Fourth, the carts should be able to withstand cleaning by strong detergents or steam. Fifth, the carts should have sides of open-work construction because customers often wish to be able to observe the contents of the carts from any angle. Sixth, the carts should be attractive and should maintain their attractiveness over a long period of time.

For the most part, the carts present in the prior art comprise a tubular metal frame or chassis to which is attached a basket of open wire-work construction. The wires are in various crossing patterns, and are usually welded together at the crossing points. Heavier wire reinforcement is used where necessary. Conventionally, the cart frame and the basket are integral with one another. That is, the basket wires and the frame components are welded together at appropriate points or the wires are interlocked with the frame components. To promote cleanliness and attractiveness, the entire cart is chrome plated. Sometimes plastic or rubber bumpers are installed at strategic points, such as corners.

The prior art carts do not satisfy all of the requirements set forth above. Many of the deficiencies associated with such carts have to do with the basket portion. The wires in the basket are welded at the crossing points, and the basket is then chrome-plated, the latter to provide a smooth, cleanable, attractive surface. The welding process for such an item is intricate, as is the plating process. It is therefore not uncommon to have welds and plating of marginal quality so that, upon hard impact, or upon a series of impacts over a period of time, wire welds and the plating are broken. The plating is also subject to being removed by wear and by scraping against other objects. This allows the base metal to rust. Also, if the basket is used in an environment where corrosion of metals is a problem, such as in grocery stores, the base metal exposed at the broken welds will eventually corrode. The cart, and particularly the basket, then becomes unsightly and unattractive. At those same exposed points, food particles can become entrapped in small cracks and crevices, even if the basket is periodically cleaned, resulting in an unsanitary condition. In addition, articles placed in the basket can become pinched or snared by the unsecured wires and plating, causing inconvenience for the customer and inflicting damage to the goods. Impacts also frequently cause the basket to be deformed inwardly, giving rise to all of the above problems.

Repair of cart baskets is a problem in itself, because it is difficult to bend the wires back into shape, and it is difficult and expensive to reweld and replate them. The cart frame and the basket are often integral with one another in prior art carts, and therefore they cannot easily be taken apart to allow repair or replacement of components. To replace the basket, welds must be broken, then replaced. Or complicated bending and interlocking of wires is necessary during disassembly and assembly. Usually, the cart is simply not repaired. When it becomes too unsightly or too unsanitary to be used, it is discarded. The loss of the entire cart for the sake of the basket is certainly uneconomical.

The above described deficiencies associated with baskets of wire work construction were addressed in applicant's U.S. Pat. Nos. 3,999,774 and 4,273,346. These patents disclose a plastic basket for use on a metal frame and have resulted in carts that are far superior to those previously known in the art. While such carts represents a significant advancement in the art, they are not the ideal cart because of the use of a metal frame or chassis.

A metal frame suffers from many of the same problems and concerns described above with respect to baskets of wire construction. Thus, they are susceptible to broken welds and plating, having a propensity to collect dirt and contaminants and cannot be easily separated from the basket to make repairs or perform routine maintenance such as cleaning. Thus, as with baskets of wire construction, metal frames or chassis deteriorate rather quickly and must be discarded.

Carts having metal frames are also quite heavy, making them difficult to push and to maneuver, especially if they have some malfunction of the wheels.

SUMMARY OF THE INVENTION

It is the overall object of the present invention to provide a new plastic chassis having a reinforced structure for use with a basket which overcomes the disadvantages of prior art frames and chassis.

A specific object of the present invention is to provide a new plastic chassis which is not easily damaged by impact.

Another specific object of the present invention is to provide a new plastic chassis which is easy to clean.

Another specific object of the present invention is to provide a new plastic chassis which can be quickly and releasably mounted to a basket.

A further specific object of the present invention is to provide a new plastic chassis which is lighter in weight than chassis known in the prior art.

A still further specific object of the present invention is to provide a new plastic chassis which does not prevent basket nesting when a basket is mounted on the chassis.

Another specific object of the present invention is to provide a new plastic chassis which is less noisy than chassis known in the prior art.

Another specific object of the present invention is to provide a new plastic chassis which is more attractive than prior art chassis, and which maintains this attractiveness over a long period of time.

Another specific object of the present invention is to provide a new plastic chassis which can be quickly and releasably coupled to a basket.

The chassis in accordance with the present invention is made of plastic, such as polyethylene, which is strong, light-weight, has a smooth finish, and can deform somewhat to absorb impact and then return to its original shape. The chassis is molded as an integral unit. Thus there are no seams to break, or cracks and crevices to collect dirt. The plastic does not rust or corrode under the influence of food acids and the like. The use of a plastic chassis has been found to substantially reduce the weight of an average cart. Rigidity is provided to the chassis by the use of suitable integral strengthening ribs, beams and struts. In addition, a number of metal reinforcing plates and rails are provided which further provided strength and rigidity to the chassis. The arrangement of the ribs, beams, struts and metal reinforcing plates and rails enable the chassis of the present invention to carry a very large load without buckling under stress.

One of the key features of this invention is the fact that the chassis can be replaced, if necessary, and further, that it can be replaced quite easily. The top portion of the chassis includes coupling means for quickly and releasably coupling the chassis to a basket having corresponding coupling means. The coupling means includes male locking elements which cooperate with corresponding female locking elements on the basket. Therefore, the basket may be quickly coupled to the chassis. Thus, damage to the basket does not require that the chassis be discarded and damage to the chassis does not require that the basket be discarded. A damaged basket may be quickly removed and a new basket installed on the cart chassis and a damaged chassis may likewise be removed and a new one installed.

Another advantage is that the plastic chassis can be made in a variety of bright colors. This makes the cart more attractive. It also makes the cart more visible, which reduces accidents both inside the grocery store and outside on the parking lot.

The noise produced by movement of carts which have the chassis of the invention or, by impacting it with other carts or other objects, is considerably less than with carts having chassis known in the prior art.

BRIEF DESCRIPTION OF THE PREFERRED EMBODIMENT

The chassis in accordance with the present invention is comprised of a number of interrelated elements, each of which are shown in the various figures. The chassis is advantageously manufactured of a molded plastic material such as polyethylene. The properties of polyethylene are ideally suited to this application, for polyethylene is relatively strong, but is flexible enough to absorb some deformation, such as caused by impact, without breaking. However, other materials having similar properties can also be used.

Figure 1:
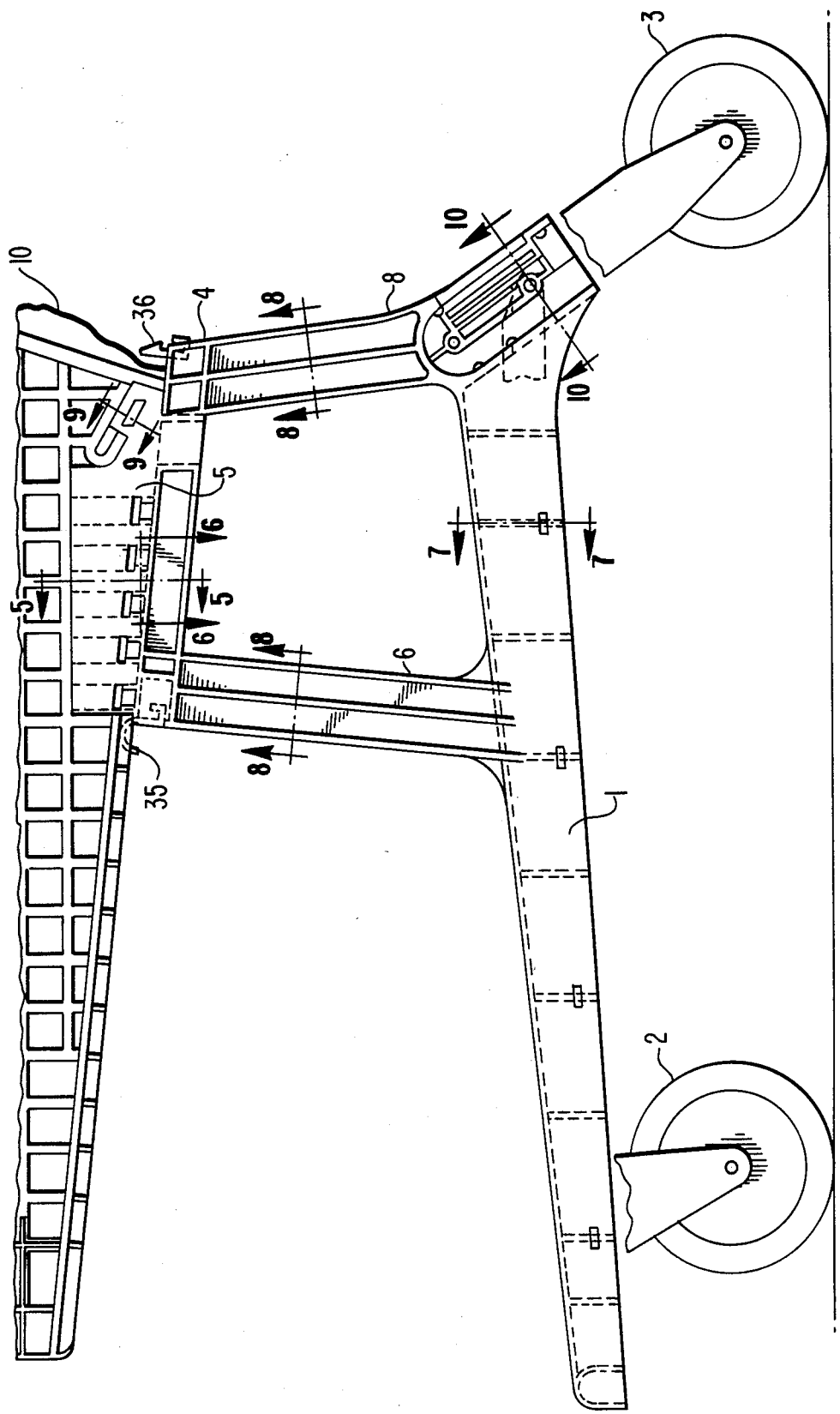
FIG. 1 is a side elevational view of the plastic chassis in accordance with the present invention.

With reference to FIG. 1, the chassis in accordance with the present invention comprises a longitudinally extending base 1 with front wheel assemblies 2 and rear wheel assemblies 3. An upstanding molded basket support 4 is supported by base 1. Basket support 4 has an upwardly facing mounting portion 5 which is adapted to mate with a corresponding basket mounting portion of basket 10 (partially shown in FIG. 1); such as the mounting portion of the basket disclosed in applicant's U.S. patent application Ser. No. 607,129 filed May 4, 1984. All of these elements are integrally molded as a single unit.

Figure 5:
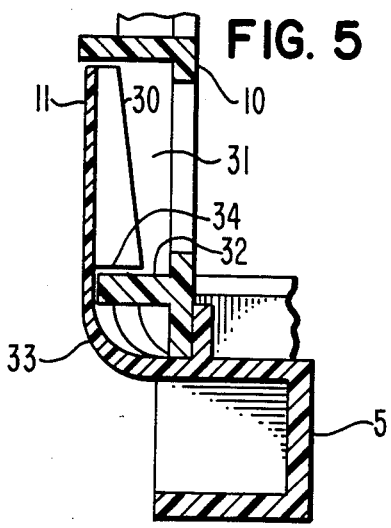
FIGS. 5-10 are sectional views taken along corresponding section lines of FIG. 1.
Figure 6:
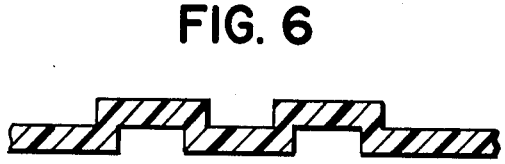

Mounting portion 5 includes locking feature 11 (better shown in FIG. 5) for quickly and releasably coupling basket 10 to mounting portion 5. Locking feature 11 includes tang 30 which is received in window 31 of basket 10 and locks over shoulder 32 of basket 10. Mounting portion 5 includes a plurality of locking features 11 to provide secure coupling of basket 10 to the chassis of the invention. As can be seen in FIG. 5, tang 30 flexes about curvature 33 around shoulder 32 as tang 30 is introduced into window 31. When edge 34 of tang 30 passes shoulder 32, the natural spring bias of the tang causes it to snap into the position shown in FIG. 5, thereby locking basket 10 securely to mounting portion 5.

As shown in FIG. 1, locking feature 11 extends along mounting portion 5 so that a plurality of tangs 30 are provided to positively lock basket 10 to mounting portion 5. This is an important consideration when one considers that a fully loaded grocery shopping basket is quite heavy. Thus, means must be provided to securely attach the basket to the cart chassis. This means is provided by locking features 11 with their plurality of tangs 30.

As shown in FIGS. 1, 2, 3, 4, 12 and 13, auxiliary locking feature 35 and 36 are provided at the front and rear of mounting portion 5 to further ensure that basket 10 is securely locked to the chassis. The auxiliary locking features comprise a tang which snaps into position over a locking shoulder similar in operation to locking feature 11 shown in FIG. 5.

Figure 3:
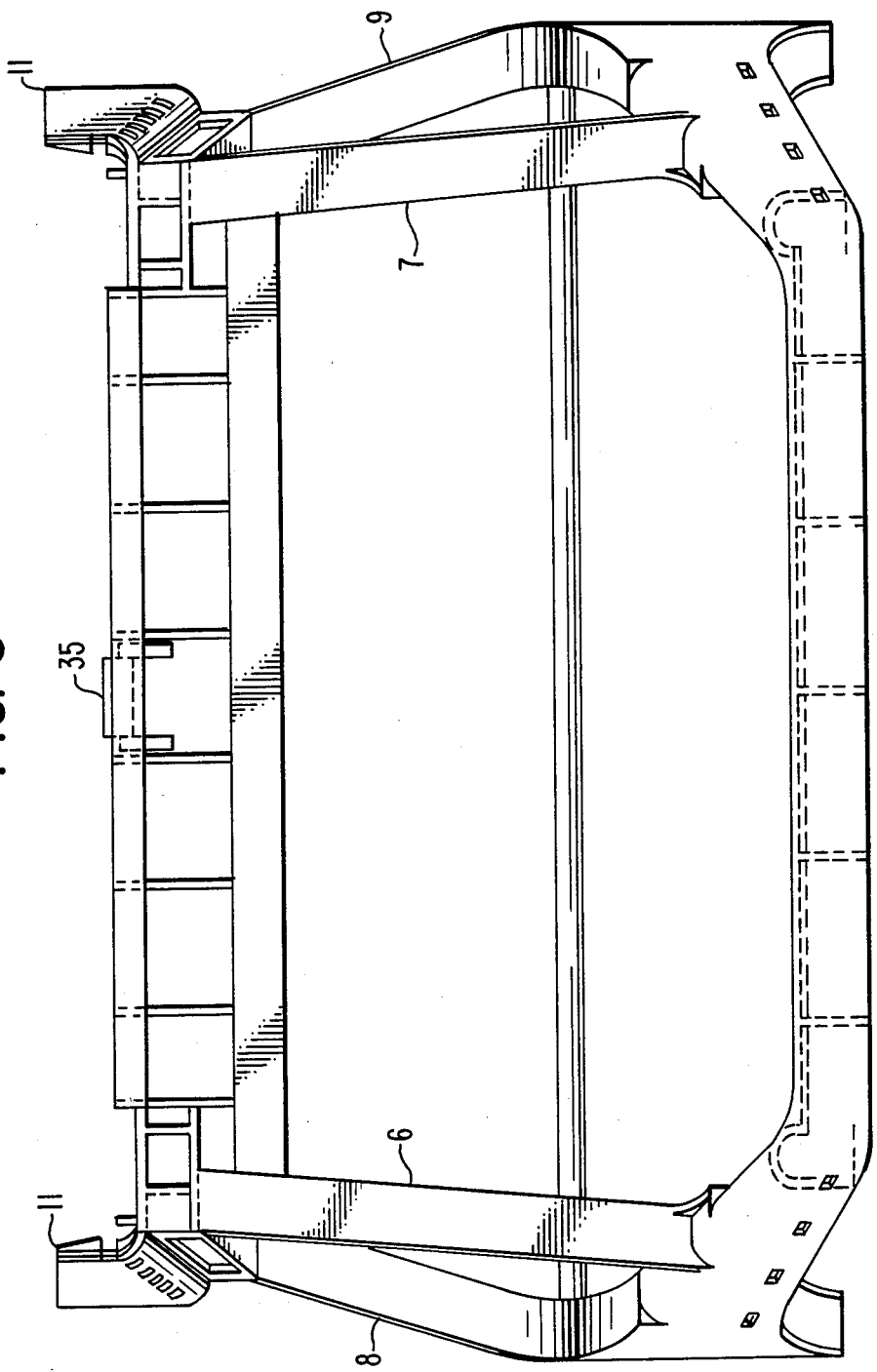
FIG. 3 is a front elevational view of the chassis.
Figure 4:
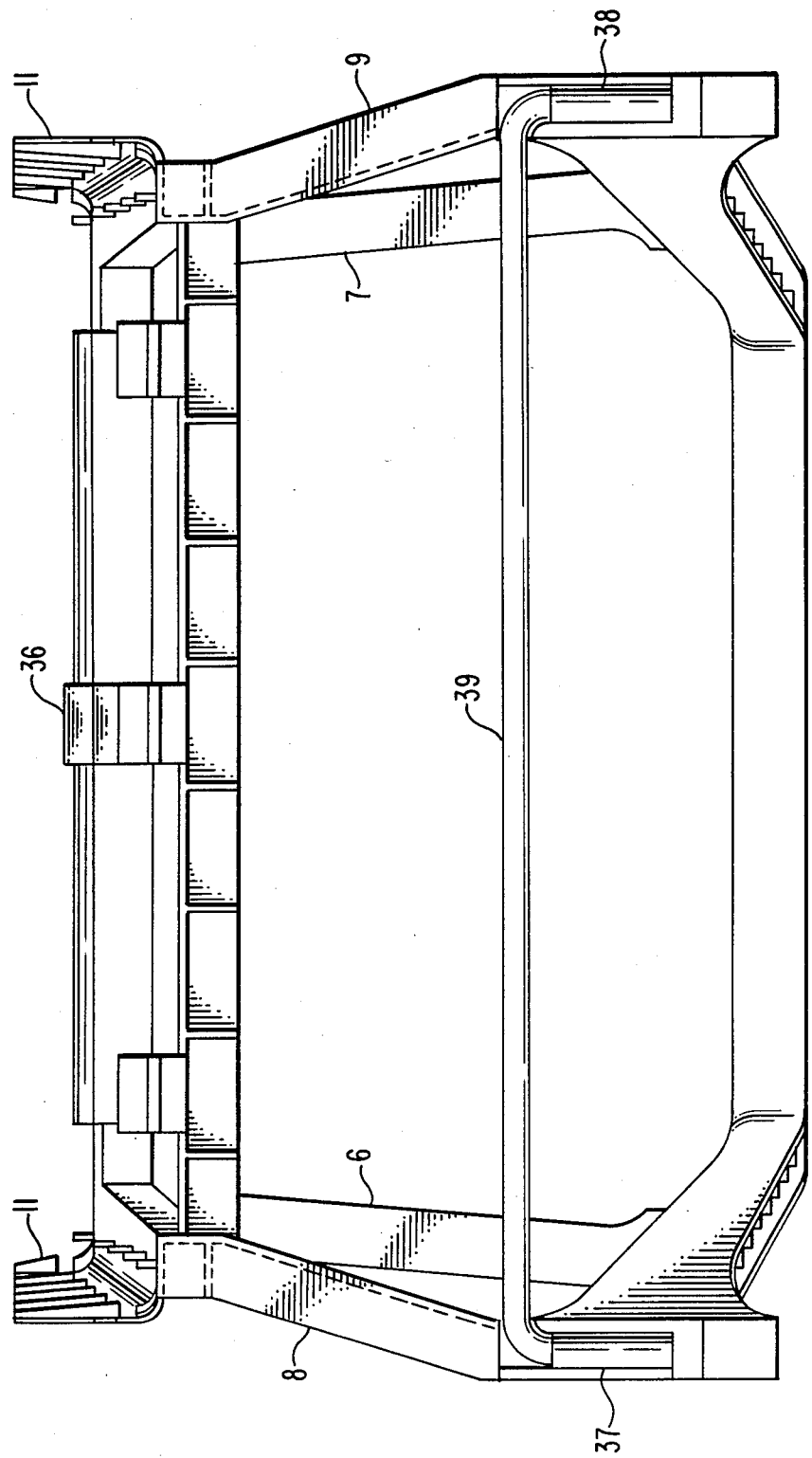
FIG. 4 is a rear elevational view of the chassis.
Figure 8:
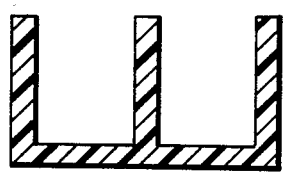
Figure 9:
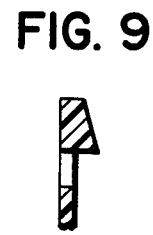

With reference again to FIG. 1, basket support 4 includes front side struts 6 and 7 and rear side struts 8 and 9 (see also FIGS. 3 and 4). The front and rear side struts are ribbed for high strength as shown in FIG. 8.

Figure 10:
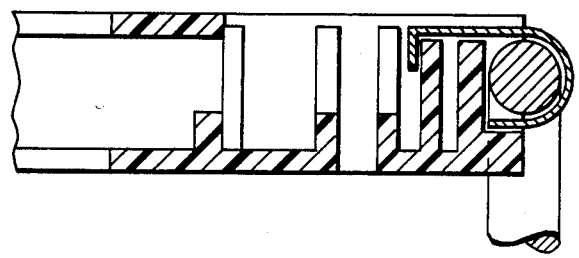
Figure 11:
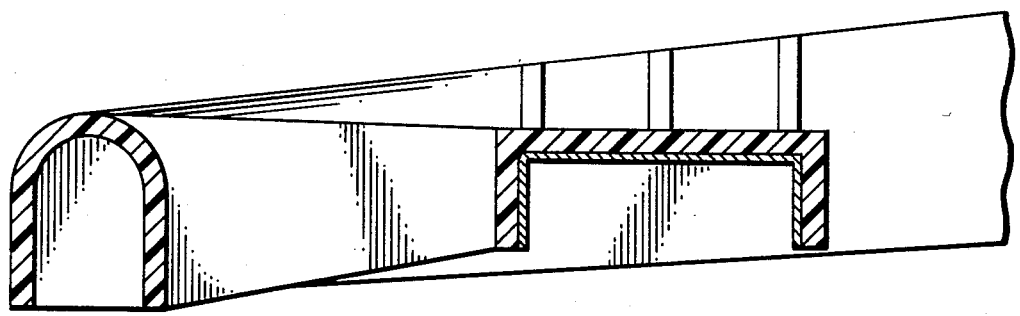
FIGS. 11-15 are sectional views taken along corresponding section lines of FIG. 2.
Figure 12:
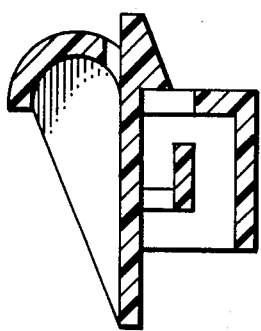
Figure 13:
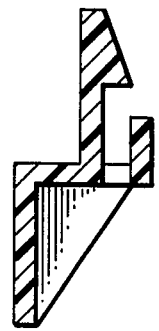
Figure 14:
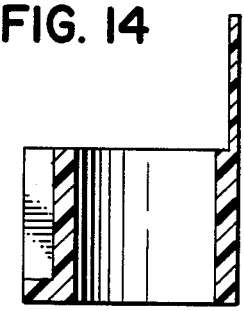
Figure 15:
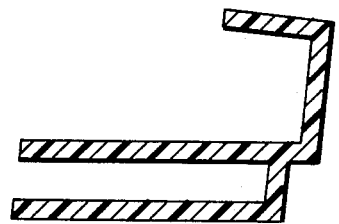

As shown in FIGS. 3 and 4, rear side struts 8 and 9 are provided with brackets 37 and 38 which receive spreader wire 39. Wire 39 prevents the rear side struts from bowing in or out when a heavy load is placed on the chassis, such as a fully loaded grocery basket. Brackets 37 and 38 may be integrally formed with side struts 8 and 9 or may be separate components attached to the side struts by various fastening means and methods known in the art. As shown in FIG. 10 (a cross-section taken along lines 10—10 of FIG. 1), brackets 37 and 38 are pieces of fabricated sheet metal which are received in slots integrally molded into side struts 8 and 9. As shown in FIGS. 3 and 4, spreader wire 39 is a metal rod but may be any material which is rigid and strong.

Figure 2:
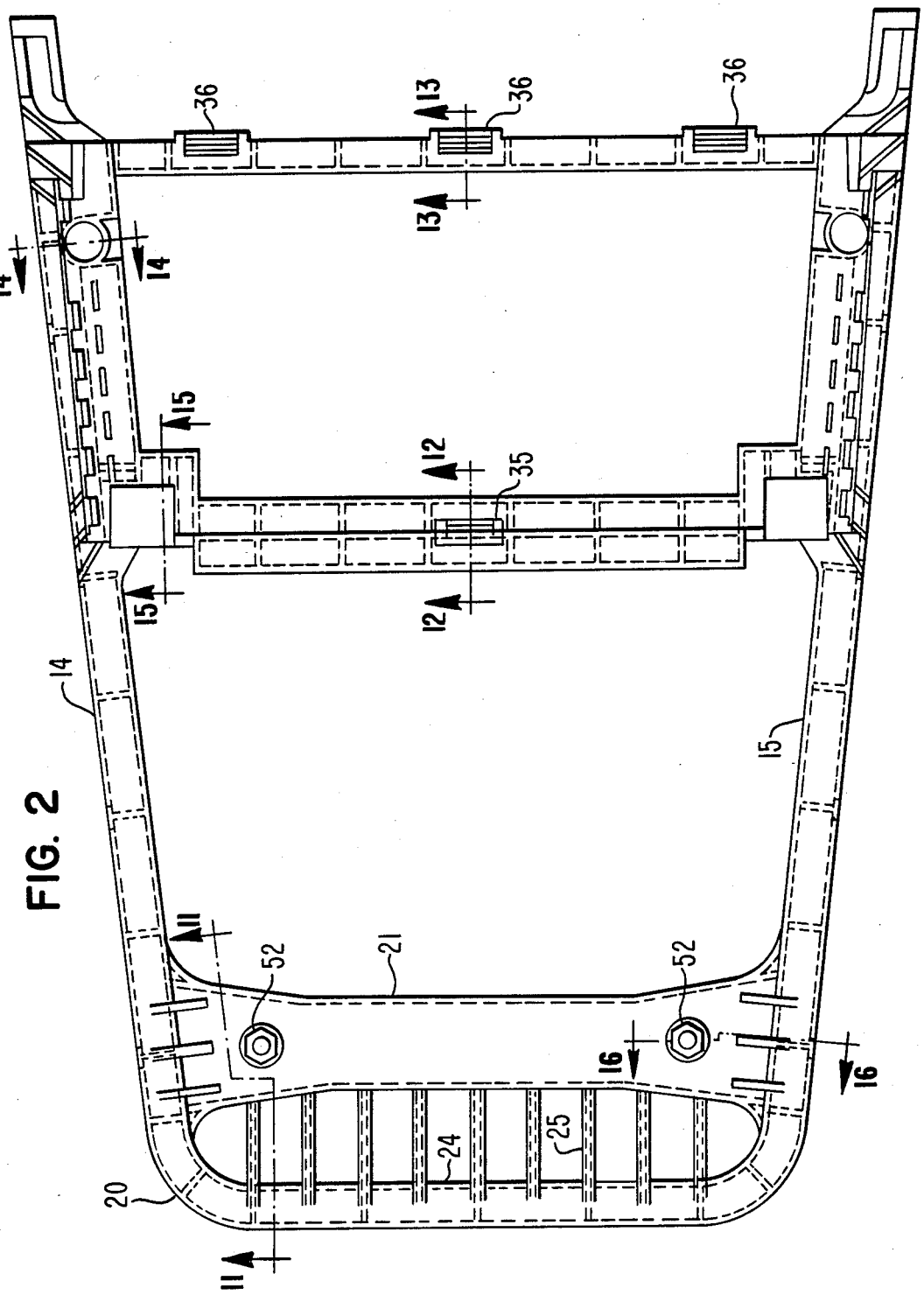
FIG. 2 is a top plan view of the chassis.

As shown in FIG. 2, base support 1, comprises spaced beams 14 and 15. Wheel assemblies 2 and 3 are mounted adjacent the rear and front ends of side beams 14 and 15. Rear wheel assemblies 3 are mounted so that the center of rotation of the wheels is aligned vertically with the axis of beams 14 and 15.

Figure 7:
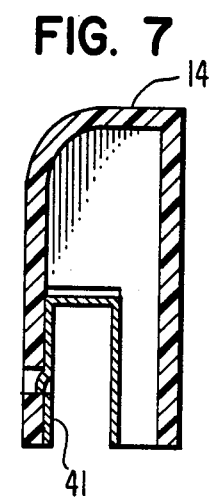
Figure 16:
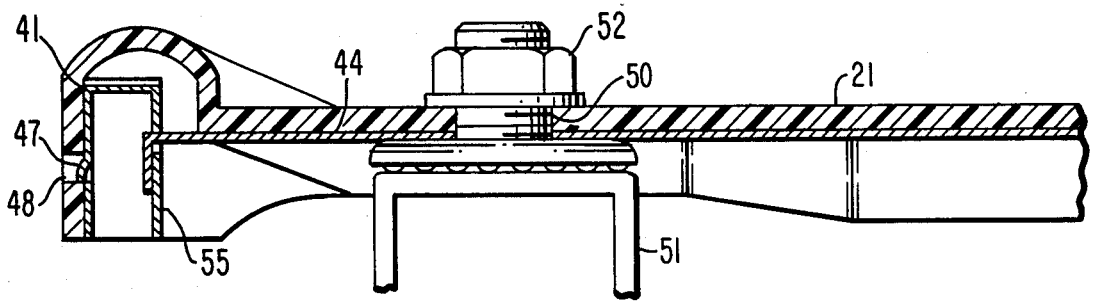
FIG. 16 is a sectional view taken along lines 16—16 of FIG. 2.
Figure 17:
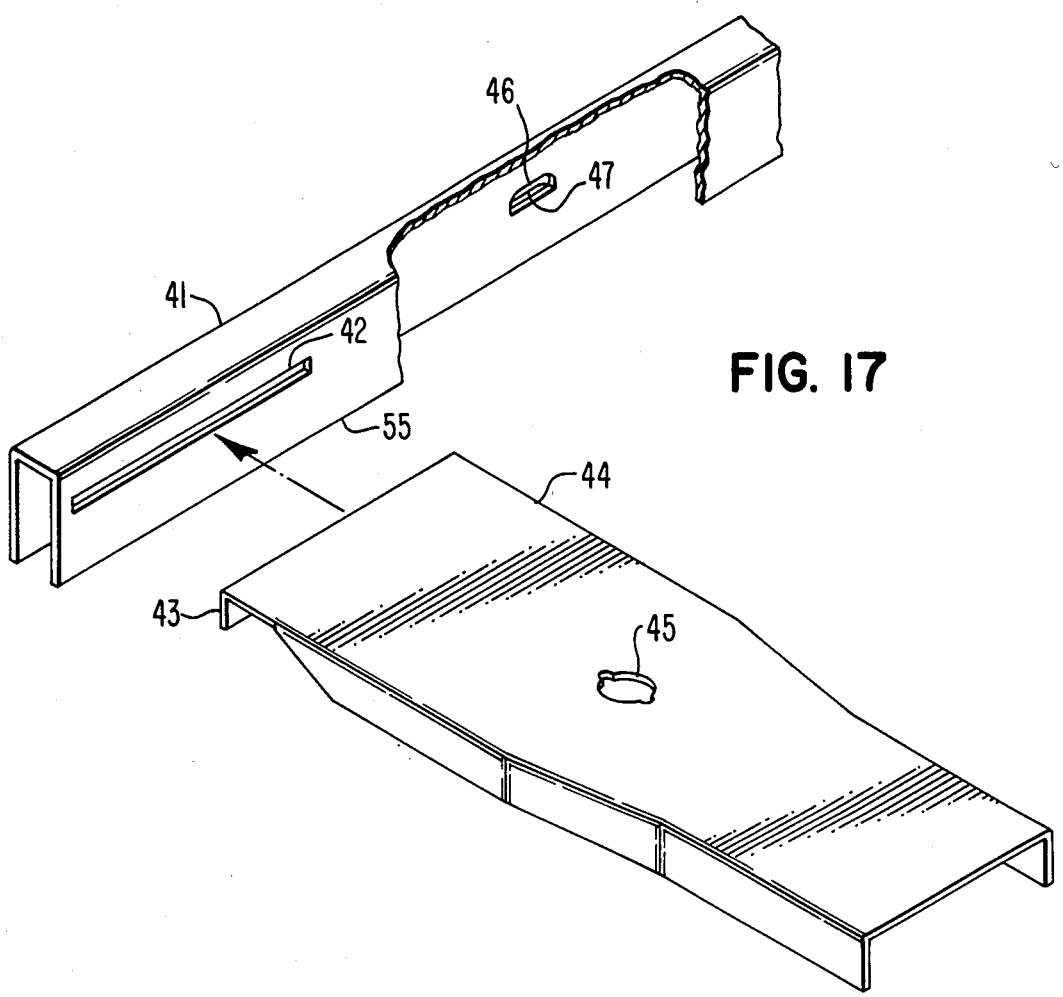
FIG. 17 is a perspective view showing the assembly of the reinforcing plate for the wheel mounting member and the reinforcing caster rail for the chassis side beams.

As shown in FIG. 7, which is a cross-sectional view taken along lines 7—7 of FIG. 1, beams 14 and 15 are integrally molded to receive strengthening rail 41 shown in FIGS. 16 and 17. As shown in these Figures, rail 41 is inverted U-shaped in construction to open downwardly and fit the inside contour of beans 14 and 15. The rail 41 used with beam 14 is a mirror image of the rail 41 used with beam 15. Rail 41 is also provided with a slot 42 in its inside wall 55 which receives edge 43 of caster plate 44 as shown in FIG. 16. The interlocking of each end of caster plate 44 with its respective rail 41 prevents beams 14 and 15 from bowing in or out under the load. Rail 41 also includes locking tab 47 which is blanked from window 46. Tab 47 is received in window 48 formed in beams 14 and 15 to hold rail 41 in place. A plurality of tabs 47 and corresponding windows 48 may be formed in rail 41 and beams 14 and 15, respectively. Rail 41 may be fabricated from 18 GA sheet metal blanked and formed accordingly.

Beams 14 and 15 are integrally molded with traverse front assembly 20. Assembly 20 include front wheel mounting member 21 which is integrally molded to receive strengthening caster plate 44 shown in FIGS. 16 and 17. Projecting from wheel mounting member 21 is nose portion 24. Nose 24 includes a plurality of longitudinal struts 25 to strengthen the nose section of base 1.

It has been found that the present invention, with its various ribs, beams, struts and metal reinforcing plates and rails, provides a chassis that is far superior to such chassis known in the prior art. The chassis of the invention is light weight, yet strong and durable and easy to maintain. Front wheel mounting member 21 and caster plate 44 includes holes 50 and 45, respectively, which receive caster wheel assembly 51. Caster wheel assembly 51 is held in place by nut 52 and may be selected from a number of caster wheel assemblies known in the prior art.

The reinforcing rails 41 are, as shown in FIG. 1, secured to the rear wheel assemblies 3. More particularly, with reference to FIG. 1, each of the rear wheel assemblies 3 comprises a bracket 60 having a shaft 61 on which the wheel 62 of the wheel assembly 3 is journaled. The bracket 60 is secured to the base 1 by rivets 63 and 64 that extend through the end portions of the side beams 14 and 15 of the base 1 and through plate portions 65 of the bracket 60 on opposite sides of the beams 14 and 15. The rivets 64 also pass through apertures in the ends of the reinforcing rails 41 whereby the rails 41 are supported directly by the brackets 60 and the wheels 62.

As mentioned above, the lower ends of the rear struts 8 and 9 are connected together by a spreader wire 39 secured thereto by the brackets 37 and 38 which thus serves as a stabilizing rod for the rear ends of the side beams 14 and 15 and the struts 8 and 9. In the normal manner, the spreader wire or stabilizing rod 39 also supports the rear of the rack (not shown) that is normally provided on the base 1 and supported at its front end by the transverse front assembly 20.

Figure 18:
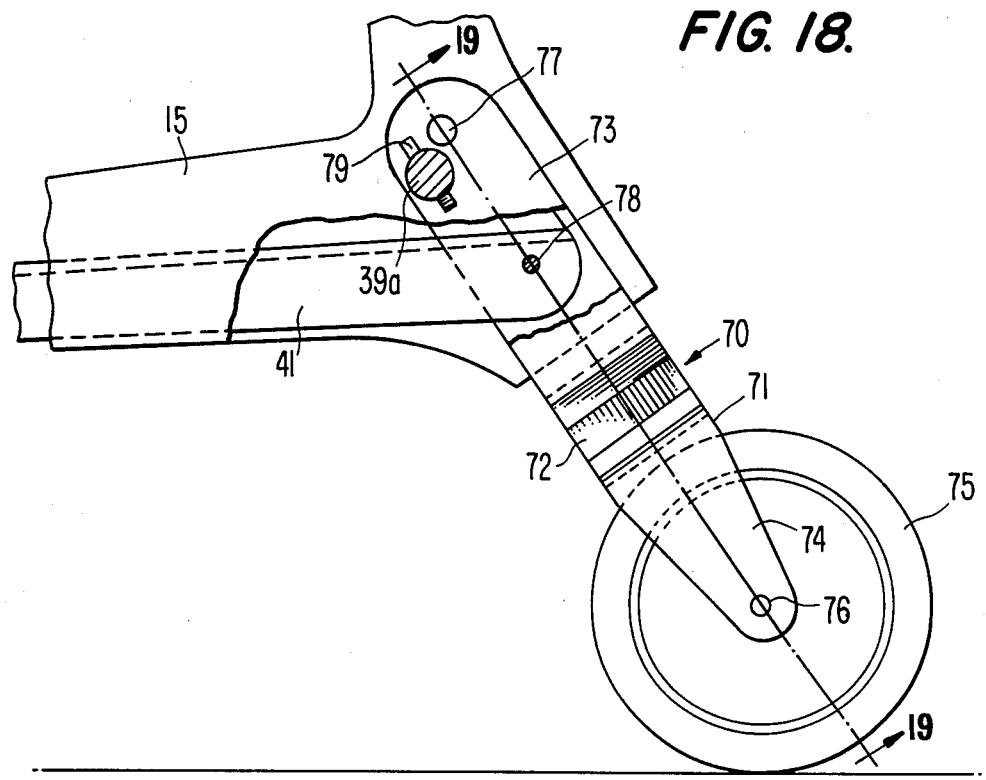
FIG. 18 is a fragmentary elevational view of a modified rear wheel mounting.
Figure 19:
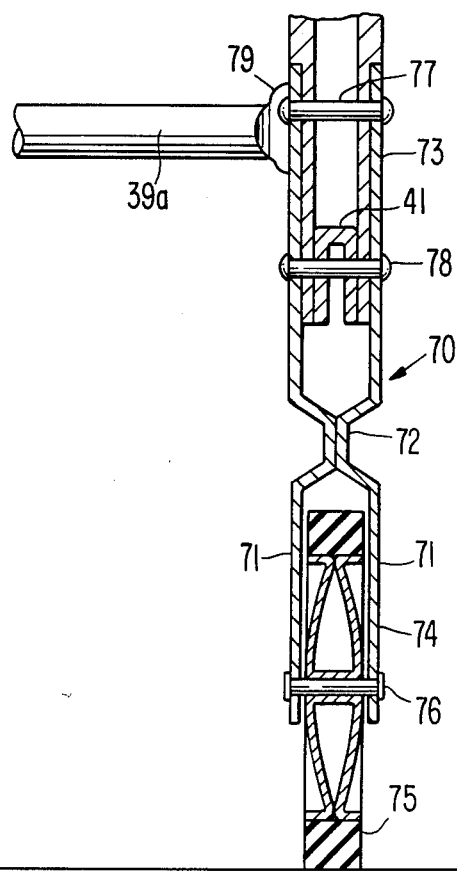
FIG. 19 is a fragmentary sectional view substantially along the line 19—19 of FIG. 18.

In FIGS. 18 and 19 there is shown a slightly modified version of the invention in which the stabilizing rod is secured directly to the wheel supporting brackets. As shown, the rear wheel supporting brackets, indicated at 70 each comprises a pair of opposed complementary plates 71 that are secured together at a fastening portion 72 in the center thereof and are stepped outwardly thereof to provide spaced parallel upper and lower portions 73 and 74 respectively. Each of the rear wheels 75 is journaled on a shaft 76 mounted at its opposite ends in apertures in the lower portion 74 of the plates 71. The upper portions 73 of the plates 71 are disposed on opposite sides of the side beams 14/15 and the associated rear struts 8/9 at the juncture thereof and are secured thereto by rivets 77 and 78 that pass through apertures in both plates 71 of the wheel assembly 70 and in the embraced portion of the side beams and struts. The lower rivet 78 also passes through apertures in the reinforcing rail 41.

The stabilizing rod 39a is secured at its ends directly to the inner plate 71 of the rear wheel supporting bracket 70 as by welding or brazing—the ends of the rod 39a being flattened as shown at 79 to provide clearance for the rivet 77.

Accordingly, there is provided a reinforcing and supporting frame for the base 1 that is completely interconnected in that the rails 41 are interconnected at their front ends by the caster plate 44 and at their rear ends by the stabilizing rod 39 and are supported by the front wheels which are mounted directly on the caster plate 44 and by the rear wheels which are journaled in the brackets 70 that are in turn secured to the reinforcing rails 41. Weight on the base 1 either from the basket 10 through the struts 6, 7, 8 and 9 or from a rack (not shown) supported by the transverse front assembly 20 and the stabilizing rod 39a, is supported directly by the reinforcing and supporting frame which in turn is supported directly by the front and rear wheels.

With the reinforcing rails 41 and the caster plate 44 seated in downwardly-open inverted U-shaped recesses in the side beams 14 and 15 and the mounting member 20, the rails 41 and caster plate 44 are enclosed at the top and sides by the beams 14 and 15 and mounting member 20. This not only protects the rails 41 and caster plate 44 from exposure but also improves the appearance of the base by providing a surface that is relatively smooth and has no surface or color discontinuities in the parts that are visible. At the same time any surface rusting of the racks 41 for example would not be visible and would not detract from the appearance of the cart.

The reinforcing rails 41, being U-shaped in cross section, also afford lateral rigidity that resists outward bending or bowing of the side beams 14 and 15 between the ends thereof. Being open downwardly, the rails do not provide closed spaces that cannot be readily cleaned.

Obviously, many modifications and variations of the above described preferred embodiment will become apparent to those skilled in the art from a reading of this disclosure. It should be realized that the invention is not limited to the particular apparatus disclosed, but its scope is intended to be governed only by the scope of the appended claims.

I claim:

1. A plastic wheeled cart frame for use with a bottom-supported basket having a downwardly facing basket mounting portion, said frame comprising:

a molded longitudinally extending base having spaced side beams and a transverse front assembly integrally molded with and interconnecting said side beams, said side beams and said front assembly each having a downwardly open inverted U-shaped recess;

reinforcing members disposed in each of said recesses;

means for connecting the ends of said reinforcing member in said front assembly to said reinforcing members in said side beams;

front and rear wheels supporting said base, means for mounting said front wheels on said reinforcing member for said front assembly and means for mounting a rear wheel at the rear ends of each of said side beams and for interconnecting the same to said reinforcing members in said side beams, and a basket support molded integrally with and upstanding from said base and having an upwardly facing frame mounting portion adapted to mate with said basket mounting portion.

2. The plastic wheeled cart frame of claim 1 in which said reinforcing members are U-shaped in cross-section.

3. The plastic wheeled cart frame of claim 2 in which said U-shaped reinforcing members are inverted and thereby open downwardly.

4. The plastic wheeled cart frame of claim 3 in which said base includes means for securing said reinforcing members in said recesses.

5. The plastic wheeled cart frame of claim 1 in which said means for mounting said rear wheels to said side beams comprises a bracket for each of said wheels, means for securing said bracket to said base and to said reinforcing members in said side rails, and stabilizing means secured at its ends to and extending between said brackets.

6. The plastic wheeled cart frame of claim 1 in which the basket support comprises struts upstanding from said side beams.

7. The plastic wheeled cart frame of claim 6 in which said struts include front and rear struts on each side beam.

8. A plastic wheeled cart frame for use with a bottom-supported basket having a downwardly facing basket mounting portion, said frame comprising:

a molded longitudinally extending base having spaced side beams and a transverse front assembly integrally molded to the front ends thereof;

longitudinal and transverse reinforcing means separate from said side beams and said transverse front assembly, said longitudinal reinforcing means being coupled to said side beams and said transverse reinforcing means and being coupled to said front assembly for reinforcing the same, locking means for securing said transverse reinforcing means to the longitudinal reinforcing means of said side beams comprising engaging means on said longitudinal reinforcing means for receiving end portions of said transverse reinforcing means, front and rear wheels supporting said base with said front wheels mounted on said transverse front assembly and said rear wheels coupled to said longitudinal reinforcing means;

an upstanding molded plastic basket support connected to said base, said support having an upwardly facing frame mounting portion adapted to mate with said basket mounting portion; and coupling means for coupling the basket to said frame.

9. The cart frame of claim 8 wherein said engaging means comprises a slot and said end portion being formed with a bent shape to thereby retain said end portion within said slot.

10. A plastic wheeled cart frame for use with a bottom-supported basket having a downwardly facing basket mounting portion, said frame comprising;

a molded longitudinally extending base having spaced side beams with recesses;

longitudinal reinforcing means mounted in the recesses of said side beams for reinforcing the same;

locking means for securing said longitudinal reinforcing means within said recess comprising a projection on said longitudinal reinforcing means and a cavity within said side beam for receiving said projection;

front and rear wheels supporting said base;

an upstanding molded plastic basket support connected to said base, said support having an upwardly facing frame mounting portion adapted to mate with said basket mounting portion; and coupling means for coupling the basket to said frame.

11. A plastic wheeled base for use as a basket support, said base comprising;

a lower base portion having a pair of longitudinally extending spaced side beams connected together at the front end by a transversely extending front end assembly;

front and rear wheels supporting said lower base portion;

a reinforcement assembly connected to said lower base portion to provide reinforcement including a pair of longitudinally extending spaced side reinforcement members and a transversely extending front reinforcement member and locking means for connecting said front reinforcement member to said side reinforcement members for connecting the same together at the front ends thereof, said locking means comprising a slot on each of said side reinforcement members for receiving the respective end portions of said front reinforcement member, said end portions being formed with a heat shape to thereby retain said end portions within said slots;

a pedestal supported by said lower base portion; and an upwardly facing basket mounting portion supported by said pedestal, said basket mounting portion including coupling means for coupling said basket to said base.

* * * * *